Aug. 24, 1937.　　　O. W. BRANDES　　　2,090,994
GAS PURIFYING APPARATUS
Filed Oct. 2, 1936

INVENTOR
OTTO W. BRANDES
BY
ATTORNEYS

Patented Aug. 24, 1937

2,090,994

UNITED STATES PATENT OFFICE 2,090,994

GAS PURIFYING APPARATUS

Otto W. Brandes, Milwaukee, Wis.

Application October 2, 1936, Serial No. 103,663

2 Claims. (Cl. 261—121)

This invention appertains to means for cleansing and deodorizing gases, and more particularly to a novel appliance for removing sediment and objectionable odors from gases leading to the atmosphere from furnaces, garbage disposal plants, manufacturing plants, and the like.

One of the primary objects of my invention is to provide a compact and durable appliance for receiving the gases to be treated, having means for washing and purifying said gases and for permitting the separation of all solids therefrom prior to the exit of the cleansed and purified air or other gas to the atmosphere.

Another salient object of my invention is the provision of means for subjecting the gases to an initial spraying action of water upon the entrance thereof into the appliance, and for leading the washed gases into a perforated outlet head submerged in a water-receiving tank, so that said gases must rise through the tank prior to the outlet thereof into the atmosphere.

A further important object of my invention is the provision of means for leading the gases and water from the sprayers through one or more Venturi tubes and over splash cone plates to insure the proper co-mingling of the gases and water, whereby to bring about the thorough washing of the gases.

A still further object of my invention is the provision of means for collecting the sediment from the gases in said tank, whereby the sediment can be quickly and easily removed.

A still further important object of my invention is to provide means whereby the water from the tank can be continuously used for the sprayers, if such should be desired.

With these and other objects in view, the invention consists in the novel construction, arrangement, and formation of parts, as will be hereinafter more specifically described, claimed, and illustrated in the accompanying drawing, in which drawing:

Figures 1, 2:
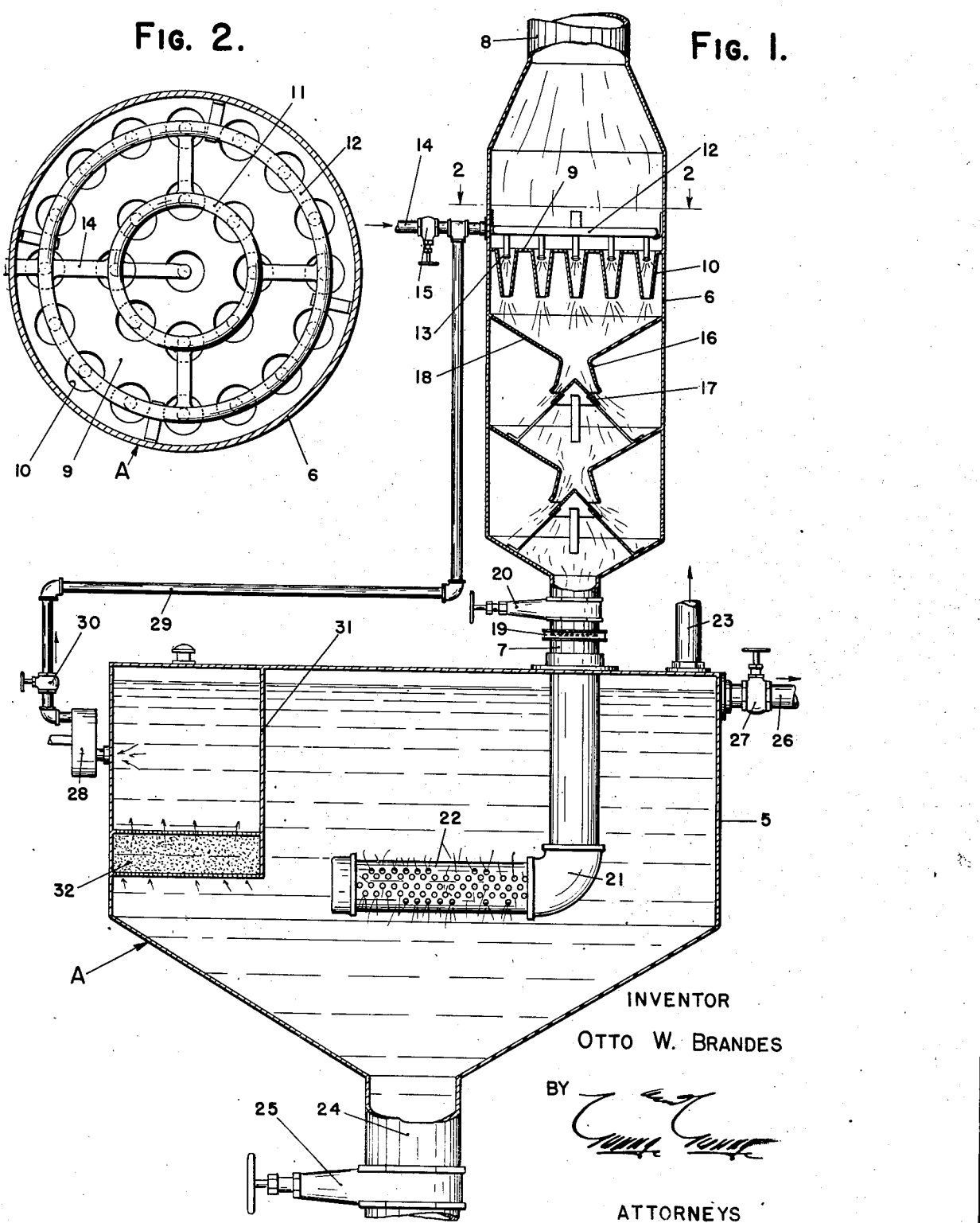
Figure 1 is a central vertical section through my improved appliance, the view being of a diagrammatic nature.
Figure 2 is a horizontal section through the washing dome, taken substantially on the line 2—2 of Figure 1, looking in the direction of the arrows, illustrating the arrangement of the spray heads or nozzles.

Referring to the drawing in detail, wherein similar reference characters designate corresponding parts throughout the several views, the letter A generally indicates my improved appliance, which comprises the water-receiving tank 5 and the washing dome 6. The dome 6 is connected with the tank 5 by means of an outlet pipe 7, which will be hereinafter more specifically described.

The dome 6 is preferably of a cylindrical shape and is formed from any material best suited for the purpose intended. The upper end of the dome has communicating therewith the gas inlet pipe 8, and the gas can be forced into the dome by a suction fan, if such should be necessary. Adjacent to the upper end of the dome or cylinder is a partition plate 9 having a plurality of depending conical shaped outlet tubes 10. Arranged above the partition plate 9 are annular water manifold pipes 11 and 12. These pipes have communicating therewith and depending therefrom rose nozzles or other spray heads 13, which extend into the conical tubes 10. A water conduit pipe 14 communicates with the water manifold pipes 11 and 12, and the flow of water through the conduit pipe can be controlled by the use of a suitable valve 15.

As the foul and dirty air or other gas is brought into the dome or cylinder 6, the same impinges against the partition plate 9 and flows through the tubes 10, where the air or other gas is subjected to the spraying action of the water from the nozzles 13. The flow of water from the nozzles also insures the drawing of the air or other gas into and through the tubes 10, in that the high velocity of the water from the nozzles, which passes through the tubes 10, causes a vacuum or suction in the dome 6.

Below the tubes 10 I arrange one or more sets of Venturi tubes 16 and conical shaped splash plates 17. The Venturi tubes 16 are carried by bowl-shaped basins 18. The conical splash plates 17 are arranged directly below the Venturi tubes and in axial alinement therewith. As shown, part of the cones 17 extend into the Venturi tubes.

As the gas and water flow through the Venturi tubes and impinge against the splash plates, a thorough co-mingling of the gas and water takes place, so that the gas will be thoroughly washed and cleaned.

In the pipe 7 directly above the tank 5, I place a removable screen 19, so that large particles in the water and gas will be caught prior to the entrance of the gas and water into the tank. A gate valve 20 can be interposed in the pipe 7 above the screen, so that flow through the pipe can be cut off during the removal of the screen.

The pipe 7 extends into the tank 5 for a considerable distance, and the lower end of the pipe is connected by means of an elbow 21 with a minutely perforated outlet head 22. The upper end of the tank is provided with an outlet air vent 23 for the deodorized and washed air or other gas.

The lower end of the tank preferably inclines toward its axial center and has communicating therewith at its lowermost point a clean-out drain 24. The drain can be provided with a gate valve 25. The tank 5 is normally filled with water, and an overflow pipe 26 communicates with the tank adjacent to the upper end thereof, and this pipe 26 can also be provided with a cut-off valve 27.

In some instances it may be desirable to use the water from the tank for the spray nozzles 13, and in this instance the valve 27 is closed, and I utilize a pump 28 for elevating the water from the tank to the nozzles.

The inlet of the pump communicates with the tank adjacent to one side thereof, and the outlet of the pump has connected thereto a water conduit pipe 29 which leads to the pipe 14 in advance of the valve 15. When water is being pumped through the pipe 29, the valve 15 for the fresh water is closed, and the valve 30 in the pipe 29 is opened. When the water in the tank is allowed to run to a sewer, the valve 27 is opened, as is the valve 15, and the valve 30 leading from the pump is closed.

When I use the water from the tank 5 for the spray nozzles 13, I preferably filter the same. Hence, I build a compartment 31 in the tank around the pipe 28, and the lower end of the compartment has any desired type of filter 32 therein.

From the foregoing description it can be seen that I have provided an exceptionally simple and compact means for thoroughly deodorizing and washing foul air and gases prior to the entrance of said air and gases into the atmosphere.

Changes in details may be made without departing from the spirit or the scope of my invention, but what I claim as new is:

1. A gas purifying apparatus comprising, an absorption tank having a liquid therein, a dome above said tank having an inlet for the gas to be purified, a partition plate in said dome provided with a plurality of depending tapered tubes, spray nozzles in said tubes for subjecting the gas to the spraying action of water as the gas flows through said tubes, means for thoroughly co-mingling the gas and water together below said tubes, means for leading the gas and water into the absorption tank below the level of the liquid therein, a sediment trap in said tank, means for pumping the water from said tank to the spray nozzles, and means for filtering said water prior to the entrance thereof into the pump.

2. A gas purifying apparatus comprising, a tank having a liquid therein, a dome above said tank having an inlet for the gas to be purified, a partition plate in said dome provided with a plurality of depending tapered tubes, water spray nozzles extending into said tubes, means for supplying water to the nozzles, a catch basin disposed below the tubes, a Venturi tube carried by the axial center of the catch basin, a conical splash plate arranged below the Venturi tube, and means for leading the gas and water from the dome into the tank below the liquid level thereof.

OTTO W. BRANDES.